Aug. 29, 1967 W. A. MESSINA 3,338,148
CAMERA AND CASSETTE APPARATUS
Filed Sept. 30, 1964 3 Sheets-Sheet 1
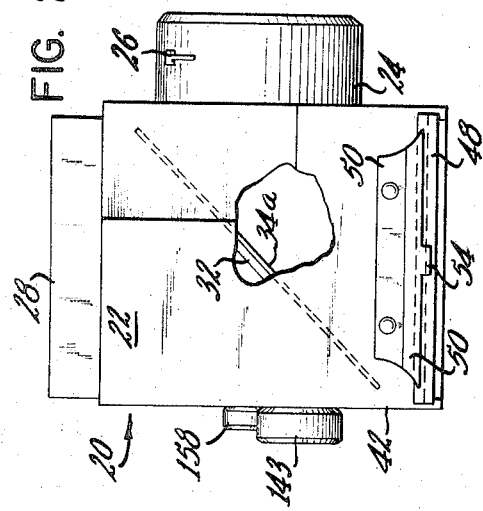
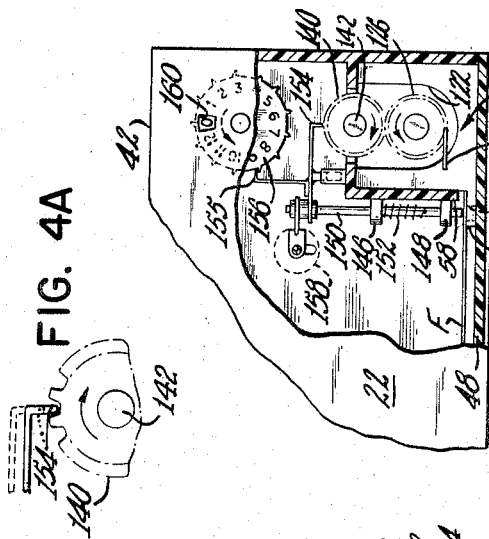
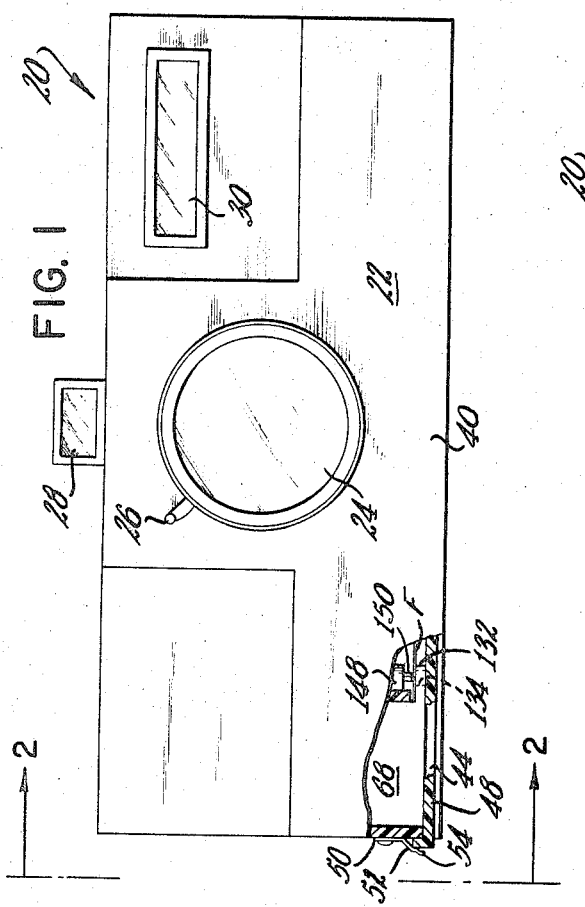
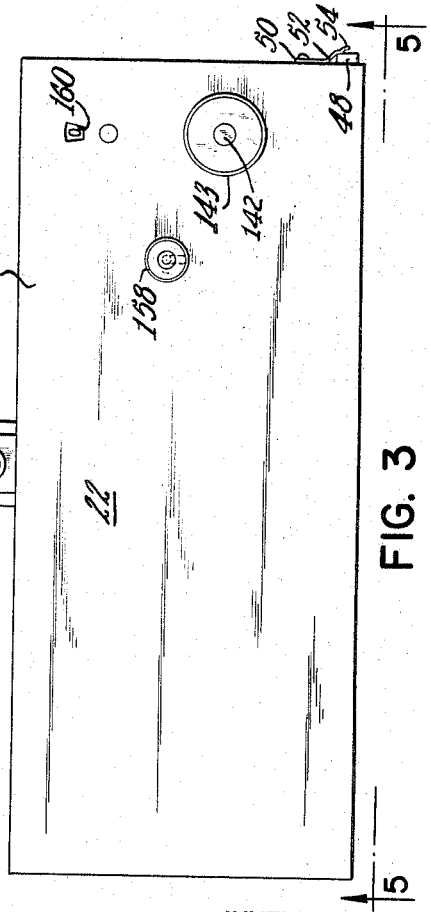
INVENTOR
WILLIAM A. MESSINA
BY
Leonard H. King
ATTORNEY Aug. 29, 1967 W. A. MESSINA 3,338,148
CAMERA AND CASSETTE APPARATUS
Filed Sept. 30, 1964 3 Sheets-Sheet 2
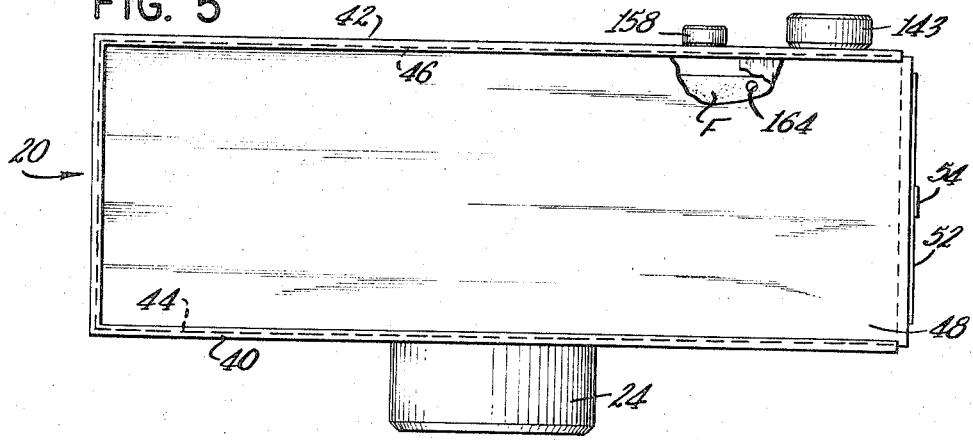
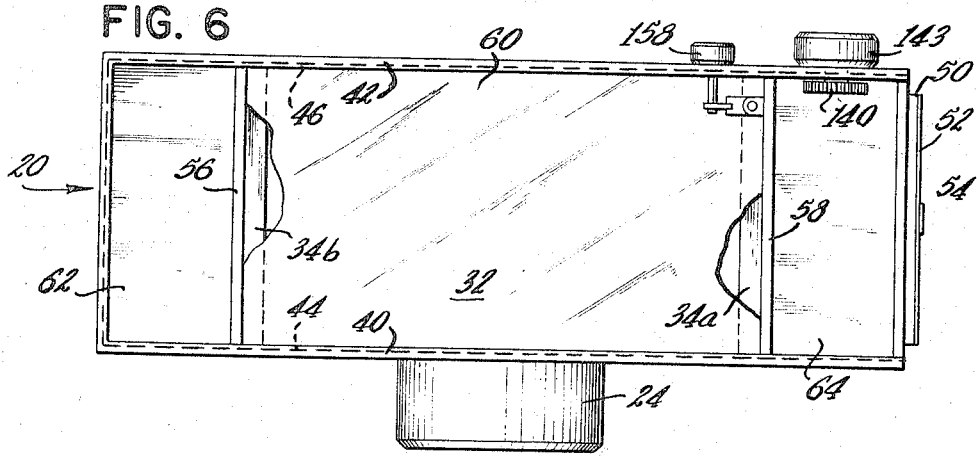
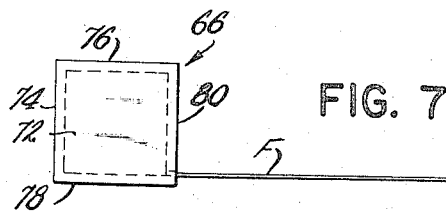
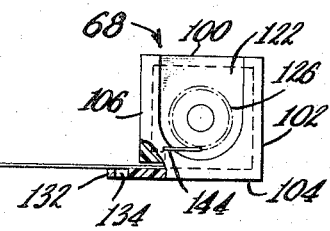
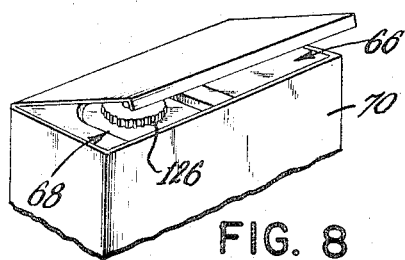
INVENTOR
WILLIAM A. MESSINA
BY
Leonard H. King
ATTORNEY

*INVENTOR.*
WILLIAM A. MESSINA
ATTORNEY

United States Patent Office 3,338,148
Patented Aug. 29, 1967

3,338,148
CAMERA AND CASSETTE APPARATUS
William A. Messina, Teaneck, N.J. (20860 Highland Lakes Blvd., North Miami Beach, Fla. 33162)
Filed Sept. 30, 1964, Ser. No. 400,364
2 Claims. (Cl. 95—31)

This invention relates to an improved still camera, particularly of the type having internal image-reversing means. The invention also relates to an improved film cassette for use with the aforementioned camera.

The usual hand held camera in the hobbyist or amateur class employs a negative type film which is exposed by the user to record an image. Because of the lens interposed between the subject and the film, the image is reversed on the negative and must be optically reversed once again after the negative is processed and used to print the positive picture.

The camera disclosed hereinafter, by the inclusion of an internal image reversing mirror, eliminates the need for negative type film medium. The film which is exposed in the camera will, upon subsequent processing, produce a positive image without additional optical reversing.

Cassettes themselves are well known in the art having been used successfully with cameras using a negative type of film. In general, the cassettes presently in commercial use are provided with a light tight film supply compartment and a light tight film take-up compartment. A rigid bridge member extends between the compartments maintaining them in proper spaced relationship. Such conventional cassettes are relatively expensive to manufacture, bulky to stock by the film retailer, and awkward to mail back to the processor after the film is exposed. In addition, in most instances the cassette has to be destroyed by the film processor in order to gain access to its contents.

The improved cassette, to be described hereinafter, is also comprised of two light tight compartments, one for film supply and one for film take-up. However, there is no bridge between the compartments so that the combined width of both cassette compartments is substantially less than that of the camera. Storage requirements for the manufacturer, retailer and user are thereby greatly reduced. At the time of using the cassette, the compartments are merely spread apart and dropped into wells in the camera and a light tight slide placed thereover. When the film is fully exposed, one cassette compartment, the supply compartment which has no mechanism at all, is discarded. The other film compartment having only a small portion of the take-up means therein is returned to the processor. By the removal of a simple screw the take-up compartment may be opened to remove the film, thereby making the compartment readily reusable.

The film need not be removed from the cassette by the user. Substantially all of the take-up means is on or in the camera itself as is the film indexing and locking means. Therefore, the size of both the camera and the cassette is maintained at a minimum and the handling of the cassette is much improved. The only part that is discarded is the hollow, empty film supply compartment which is completely devoid of all mechanism.

Accordingly, it is an object of the present invention to provide an improved low cost cassette type still camera and which utilizes internal image reversing means.

It is another object of the present invention to provide improved film indexing and locking means in the aforementioned camera.

Still another object is to provide an improved cassette for the aforementioned camera.

An additional object is to provide an improved cassette, a portion of which is reusable.

A further object is to provide an improved dual cassette film device having no physical connection between the supply and take-up compartments other than the film itself.

Another object is to provide a low cost, compact cassette that is easy to store, handle and ship.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

In the drawing:

FIG. 1 is a front elevational view, partly broken away and partly in section, illustrating the improved camera and cassette combination of the present invention.

FIG. 2 is a side elevational view taken along line 2—2 of FIG. 1.

FIG. 3 is a rear elevational view of the improved camera and cassette combination of the present invention.

FIG. 4 is a fragmentary view similar to FIG. 3 with a portion broken away to illustrate certain mechanism contained within the camera.

FIG. 4A is an enlarged fragmentary showing of the film locking mechanism.

FIG. 5 is an underside view of the camera taken along line 5—5 of FIG. 3.

FIG. 6 is an underside view, partially broken away, of the camera, similar to FIG. 5, with the sliding light tight cover plate removed.

FIG. 7 is an elevation view of the cassette chambers displaced from each other and ready to be inserted into the camera.

FIG. 8 shows the cassette in a convenient shipping container.

Figure 9:
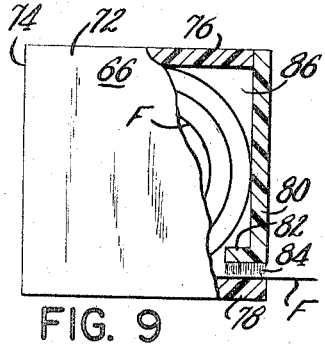
FIG. 9 is an elevation view of the cassette supply compartment with a portion broken away.

Referring now to the drawing, FIG. 1–FIG. 6 illustrate some of the major components of camera 20. Camera housing 22 is provided with a lens and shutter system 24 and a shutter release latch 26. Viewing lens 28 is positioned on the top surface of the optical housing above the lens and shutter system in order to enable the user to see and compose the picture being taken. In a conventional manner a photocell type light meter 30 may be internally coupled to the lens and shutter system.

Image-reversing mirror 32 is mounted in the central portion of camera housing 22 and is positioned directly behind lens and shutter system 24. Mirror 32 is secured by means of a suitable adhesive to a pair of ledge members 34a and 34b. The ledges, in turn, are accurately located during the fabrication of the camera housing at an angle of 45° with the horizontal centerline of the lens and shutter system. Thus it will be seen that light rays passing the lens and shutter system will be reflected downwardly at right angles to their original plane.

The lower, inside surfaces of front and rear walls 40 and 42 of housing 22 are provided with slots 44 and 46, respectively, extending the length thereof. The slots are dimensioned to slidingly receive a cover plate 48 in a light tight relationship. The cover plate may be retained in place by any one of many suitable means, there being shown for purposes of illustration, a resilient spring clip 50 rigidly secured along one edge to the side wall of the optical housing. As may best be seen in FIG. 1 and FIG. 2, lip portion 52 retains the upturned end of the cover plate. Outwardly displaced extension portion 54, formed on the free end of clip 50, provides a finger grip for the clip so that it may be lifted out of position to permit the cover plate to be removed.

FIG. 5 and FIG. 6 are bottom views of the camera illustrating, respectively, the cover plate in place and the cover plate removed. It will be seen in FIG. 6 that two transverse walls 56 and 58 are formed in the camera housing so that, in effect, the camera is divided into three main compartments. Central compartment contains reversing mirror 32 as well as other mechanism to be described hereinafter in conjunction with film advance, indexing and locking. Outboard compartments 62 and 64 form receiving pockets or wells for the cassette supply box 66 and cassette take-up box 68, respectively. When viewed from the righthand side of FIG. 7, the supply and take-up boxes, as well as film F extending therebetween, are rotated 90° clockwise and are dropped into their respective wells before reinserting cover plate 48 into grooves 44 and 46.

Before discussing the structure of the cassette with respect to the camera, a particularly advantageous feature of the present invention should be pointed out. The cassette lends itself to extremely compact and inexpensive packaging. A simple box 70, of cardboard or the like (FIG. 8), may be used to hold both the supply and the take-up portions of the cassette since there is no rigid bridge therebetween. Almost all of the film is coiled in the cassette supply box. The free end of the film is taped to a spool in the take-up box so that when the cassette is removed from container 70 the cassette boxes may be separated, as shown in FIG. 7, for insertion into the camera. It is not necessary to touch the film in any way. Since the cassettes are each light tight, the remainder or usable portion of the film will not become exposed.

Figure 10:
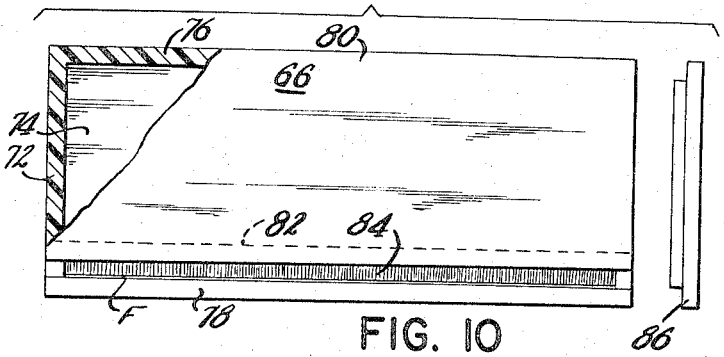
FIG. 10 is an exploded elevation view of the cassette supply compartment of FIG. 9 there being portions broken away.
Figure 12:
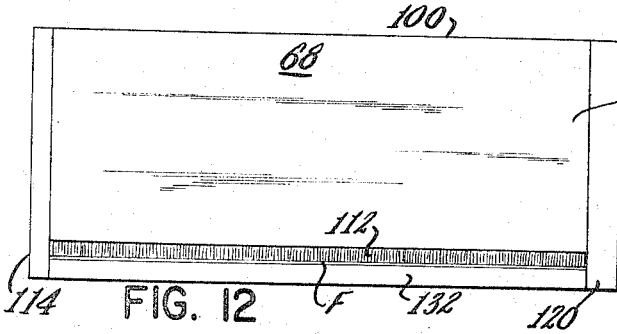
FIG. 12 is a side elevation view of the cassette take-up compartment.
Figure 11:
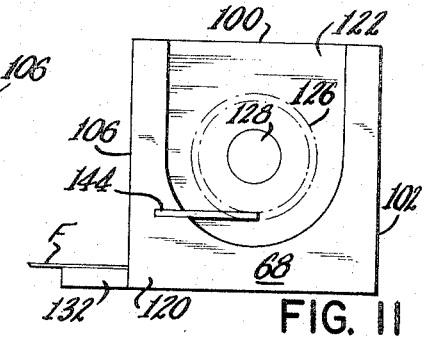
FIG. 11 is an end elevation view of the cassette take-up compartment.
Figure 13:
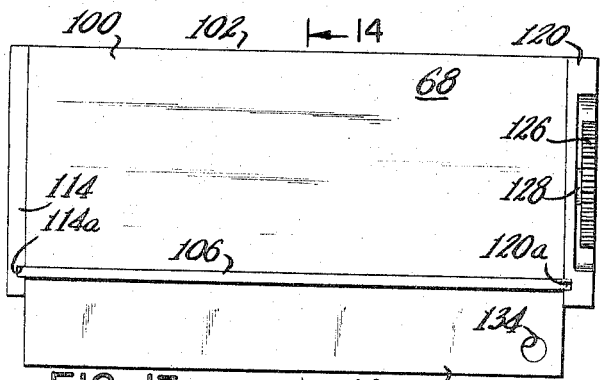
FIG. 13 is a plan view of the cassette take-up compartment.
Figure 14:
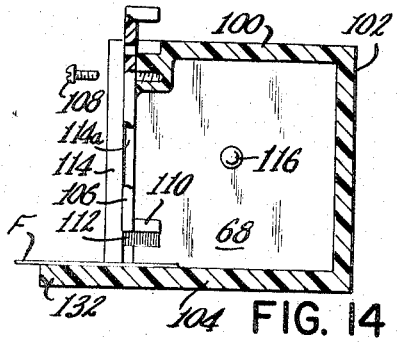
FIG. 14 is an end elevation view taken along line 14—14 of FIG. 13 in a direction opposite to FIG. 11 with a wall portion partially broken away and with other elements exploded.
Figure 15:
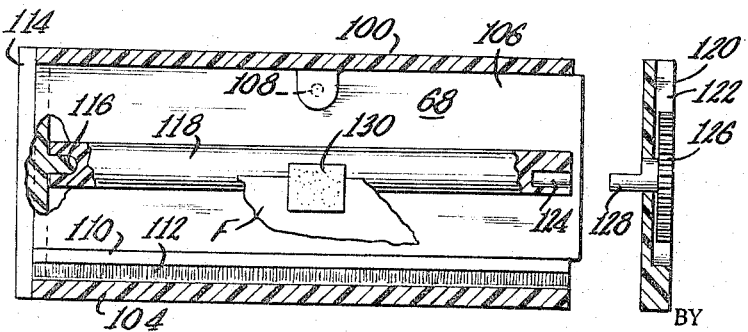
FIG. 15 is an exploded, sectional plan view of the take-up compartment of the cassette showing the contents thereof.

The construction of the supply box 66 of the cassette will now be described with reference to FIG. 9 and FIG. 10. Walls 72, 74, 76 and 78 are comolded as a single unit to form four of the required six sides of the box. Side wall 80 is provided with an inwardly depending leg 82 to which is secured a light-trapping material 84 such as velour. Wall 80 is secured to sides 72, 74, 76 and 78 by heat sealing such as that the material 84 is only slightly spaced from the inside of wall 78. The coiled roll of film F is then inserted into the box, the free end of the film drawn out between light seal 84 and wall 78 and then the end piece 86 is heat sealed in place over the open end of the box.

Take-up box 68 has essentially the same construction and will now be described in greater detail with respect to FIG. 11–FIG. 15. Walls 100, 102 and 104 are comolded as a single unit to form three of the required six sides of the box. Side wall 106 is removably secured to wall 100 by means of a screw 108. Side wall 106 is additionally provided with an inwardly facing leg 110 to which is applied a light-sealing material 112 such as velour. First end wall 114 having a groove 114a is rigidly secured to walls 100, 102 and 104 and is provided with an inwardly facing, integrally molded bearing post 116 adapted to rotatably support spool 118 at one end thereof.

The second end wall 120, of somewhat thicker cross section, is provided with a groove 120a, recess 122 on the outer surface thereof, and with a central bore. An inexpensive molded plastic gear 126, having a half round shaft 128, is disposed in the recess with the shaft extending through said bore. Spool 118 is provided with an end bore 124 similar in shape to the end of shaft 128 so that when the two parts are assembled they are keyed together. The pieces are then solvent-sealed to each other and wall 120 added and also sealed to the assembly. Other means to key the spool to the gear are well known and may be employed without departing from the spirit of the invention.

With the five sides of the take-up box assembled as described hereinabove, the free end of film F is secured to spool 118 by means of a small piece of adhesively backed tape 130. Wall 106 may then be inserted into grooves 114a and 120a and then secured by means of screw 108 to complete the box. It should be obvious that while take-up box 68 contains a minimum of mechanism, it is nevertheless reusable by removing the screw 108 and sliding out wall 106. Thus appreciable savings may be had by both the manufacturer and the consumer.

Wall 104 of take-up box 68 is provided with a ledge portion 132 extending substantially the entire length thereof. Hole 134 is formed at one end of the ledge and cooperates with the film take-up indexing and locking mechanism now to be described with respect to FIG. 4.

With the cassette in place, gear 126 meshes with gear 140 projecting inwardly from the rear wall of optical housing 22. Gear 140 is rigidly secured to shaft 142 which supports wind up knob 143 on the outside of the housing. The wind up knob can only be turned in the direction of film advance since resilient plate 144 is embedded in end wall 120 of take-up box 68 and interferes with one direction of rotation of gear 126. Plate 144 slips over the teeth of the gear when it is rotated in the direction that causes the advance of the film. Bearing brackets 146 and 148 are integrally molded on transverse wall 58 to guide and support vertically movable post 150. Spring member 152, abutting the underside of bearing bracket 146 and terminating at its other end in post 150 provides resilient support thereof. Locking member 154 extends outwardly from post 150 and is adapted to engage one tooth of gear 140 (FIG. 4A).

Before the cassette is dropped in place, an internal counter wheel 156 bearing radial numbers 0–12 is actuated by means of depressing external slide button 158 a sufficient number of times to expose the number "0" through window 160 in the back wall 42 of the camera housing 22. The cassettte is then dropped into place with external slide button 158 in the raised position. In this manner post 150 rests on top of the film and locking member 154 is disengaged from gear 140, as shown in dotted outline in FIG. 4A. The film is advanced by knob 143 through meshing gears 140 and 126 until post 150 finds the first of twelve holes 164 formed proximate to the edge of the film (FIG. 5). The post 150 will then be urged downwardly through the hole in the film and through hole 134 formed in ledge 132 of take-up box 68. With the holes in registry, the downward travel of post 150 causes arm 155 to angularly displace one tooth of counter wheel 156. The next number will then appear in the window indicating the number of the picture or the frame to be shot.

It will be observed that the position of the film is locked by post 150 and the winding knob is locked by member 154. The counter mechanism is also automatically advanced by the downward travel of post 150. To take the next picture, button 158 is pushed upwardly thus removing post 150 from registered holes 164 and 134 and also disengaging locking member 154 from gear 140. The wind up knob is then advanced until the cycle is repeated.

Of particular importance as far as cost reduction is concerned is the fact that substantially all of the mechanism is contained in the camera body rather than the cassette.

Both the camera and cassette hereinabove described and illustrated provide ease of use coupled with low cost in manufacturing. The cassette itself may be packaged in a very small container making it simple to merchandise, handle and mail to a processor after the film has been exposed. It is relatively simple for the manufacturer to load film into the cassette and it is even more simple for the user to load the cassette into the camera. Only the supply portion of the cassette which is an inexpensive molded piece and which is devoid of any mechanism is discarded after the film is exposed. By virtue of its novel construction, the take-up portion may readily be opened at the processor's plant and be reused as part of another cassette. The camera and not the cassette contains the major portion of the take-up mechanism. Simple yet effective and inexpensive means are provided to advance, index and lock the film in position for the exposure of one frame at a time.

There has been disclosed heretofore the best embodiments of the invention presently contemplated and it is to be understood that various changes and modifications may be made by those skilled in the art without departing from the spirit of the invention.

What is claimed is:

1. An improved camera for use with a light sensitive photographic film comprising in combination:
  (a) a housing including a lens and shutter system on the front surface thereof, an external shutter release latch and a viewing lens, said housing being divided into three separate, side-by-side compartments at the rear thereof opposite the lens and shutter system;
  (b) an image-reversing mirror disposed in the central housing compartment, said mirror being positioned at a 45° angle with the horizontal centerline of said lens and shutter system whereby light passing through said lens and shutter system is reflected at right angles to its original path;
  (c) a film cassette comprising a first light tight chamber holding a supply of unexposed film in coiled form therein, said first chamber having a slot extending the length thereof to permit the passage of one end of the film therethrough and a second light tight chamber having a longitudinal slot adapted to receive the end of the film emanating from said first chamber, said first and second chambers being disposed in the outboard compartments of said housing with the sensitive side of the film being in opposition to and facing said mirror;
  (d) means to advance the film in stepwise increments from said first cassette chamber to said second cassette chamber whereby between each step an unexposed portion of the film is positioned opposite and facing said mirror;
  (e) means to stop the advance of the film when an unexposed portion thereof is opposite and facing said mirror wherein said means to stop the advancement of the film comprises an apertured ledge integral with said second chamber, said ledge extending outwardly from said second chamber in the direction of said first chamber when said cassette is in place in said camera and a resiliently biased post disposed directly over the aperture in said ledge said post bearing on the surface of the film and being arranged to move downwardly when the aperture in said ledge and one of the perforations in the edge of the film are in registry; and
  (f) internally positioned frame counting means integral with and responsive to the motion of said post, the housing of said camera being further provided with a window through which the number of the picture to be taken is indicated.

2. The camera of claim 1 wherein said frame counting means comprises a disc having indicia thereon indicating the number of frames in the film, the total number of indicia being the same as the total number of perforations in the film, said disc being rotatably journaled in the camera housing, whereby the indicia on said disc are visible through the housing window, said disc being furthur provided with a plurality of radial teeth extending from the periphery thereof and a disc actuator integral with and responsive to the downward motion of said post, said actuator being in contact with said disc whereby said disc is angularly displaced to expose the next higher indicia each time said post engages the apertures in said ledge.

References Cited

UNITED STATES PATENTS

| | | | |
|---|---|---|---|
| 664,770 | 12/1900 | Meyer | 95—32 |
| 1,232,125 | 7/1917 | Trippel | 95—32 |
| 1,828,205 | 10/1931 | Schmitt | 95—31 |
| 1,947,482 | 2/1934 | Mihalyi | 95—31 |
| 1,997,332 | 4/1935 | Green | 95—31 |
| 2,012,334 | 8/1935 | Barenyi | 95—32 |
| 2,132,157 | 10/1938 | Goldhammer | 95—31 |
| 2,504,323 | 4/1950 | Gillespie | 95—31 |
| 2,548,549 | 4/1951 | Mihalyi | 95—31 |
| 2,751,275 | 6/1956 | Mansberg | 95—42 X |
| 2,988,973 | 6/1961 | Bohm | 95—31 |

JOHN M. HORAN, *Primary Examiner.*